United States Patent [19]
Ross et al.

[11] 3,939,776
[45] Feb. 24, 1976

[54] RAILWAY TRUCK MAGNETIC SUSPENSION

[75] Inventors: James A. Ross, La Jolla; Bert C. Harris, Foster City, both of Calif.

[73] Assignee: Rohr Industries, Inc., Chula Vista, Calif.

[22] Filed: Aug. 1, 1974

[21] Appl. No.: 493,688

Related U.S. Application Data

[63] Continuation-in-part of Ser. No. 251,118, May 8, 1972, Pat. No. 3,886,871.

[52] U.S. Cl. ...... 104/23 FS; 105/157 R; 105/182 R; 105/200; 105/207; 267/3; 308/10
[51] Int. Cl.².... B61F 5/04; B61F 5/52; F16C 39/06; F16F 6/00
[58] Field of Search.......... 104/23 FS, 120, 148 MS; 105/77, 148, 157 R, 164, 182 R, 197 R, 200, 206 R, 207, 453; 267/3, 182; 308/10, 15; 318/687; 330/12; 335/290

[56] References Cited
UNITED STATES PATENTS

| | | | |
|---|---|---|---|
| 408,465 | 8/1889 | Dewey | 308/15 X |
| 833,635 | 10/1906 | Rogers | 105/77 |
| 1,081,260 | 12/1913 | Zoelly | 335/290 |
| 1,331,039 | 2/1920 | Zoelly | 105/453 |
| 1,719,231 | 7/1929 | McLaren | 104/148 MS X |
| 3,330,384 | 7/1967 | Bertin et al. | 104/120 X |
| 3,512,852 | 5/1970 | North | 308/10 |
| 3,579,132 | 5/1971 | Ross | 330/12 X |
| 3,631,806 | 1/1972 | Barthalon | 104/148 MS X |
| 3,638,093 | 1/1972 | Ross | 318/687 |
| 3,663,075 | 5/1972 | Kronenberg | 308/10 |
| 3,780,667 | 12/1973 | Miericke et al. | 104/148 MS |
| 3,849,724 | 11/1974 | Ghibu et al. | 104/148 MS X |

FOREIGN PATENTS OR APPLICATIONS

| | | | |
|---|---|---|---|
| 261,085 | 6/1913 | Germany | 104/148 MS |
| 643,316 | 4/1937 | Germany | 104/148 MS |
| 644,302 | 4/1937 | Germany | 104/148 MS |
| 707,032 | 6/1941 | Germany | 104/148 MS |

*Primary Examiner*—M. Henson Wood, Jr.
*Assistant Examiner*—Howard Beltran
*Attorney, Agent, or Firm*—Patrick J. Schlesinger; Frank D. Gilliam

[57] ABSTRACT

An improved railway truck for providing non-contact active support between the unsprung and the sprung elements as well as lateral stability and banking of vehicles used in surface supported transportation systems having unsprung surface contacting elements, sprung load carrying elements, magnetic force fields, inertial and position sensing elements mounted on the sprung element and a non-linear feedback circuit for actively varying the strength of the force field to maintain a relatively stable air gap between the unsprung and sprung elements while also holding the sprung element to a smooth course notwithstanding irregular surface conditions encountered by the surface contacting elements or variations in loading on the load carrying element.

3 Claims, 10 Drawing Figures

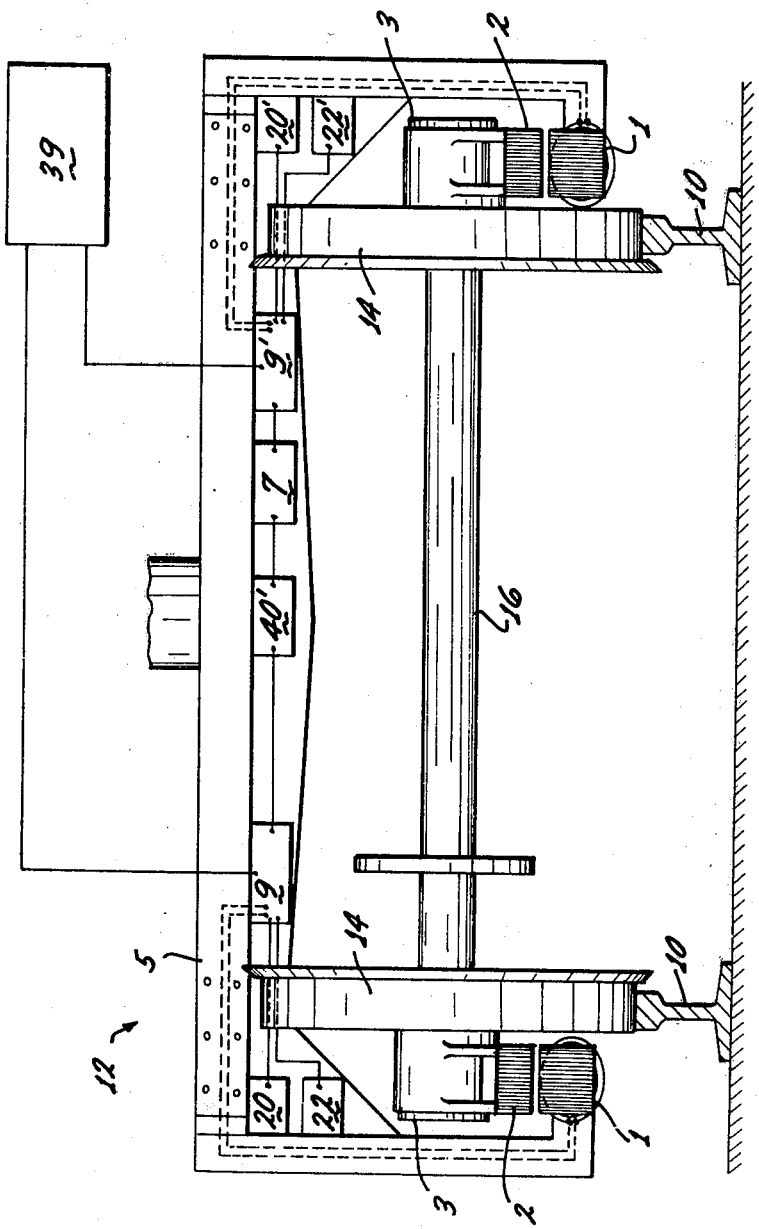

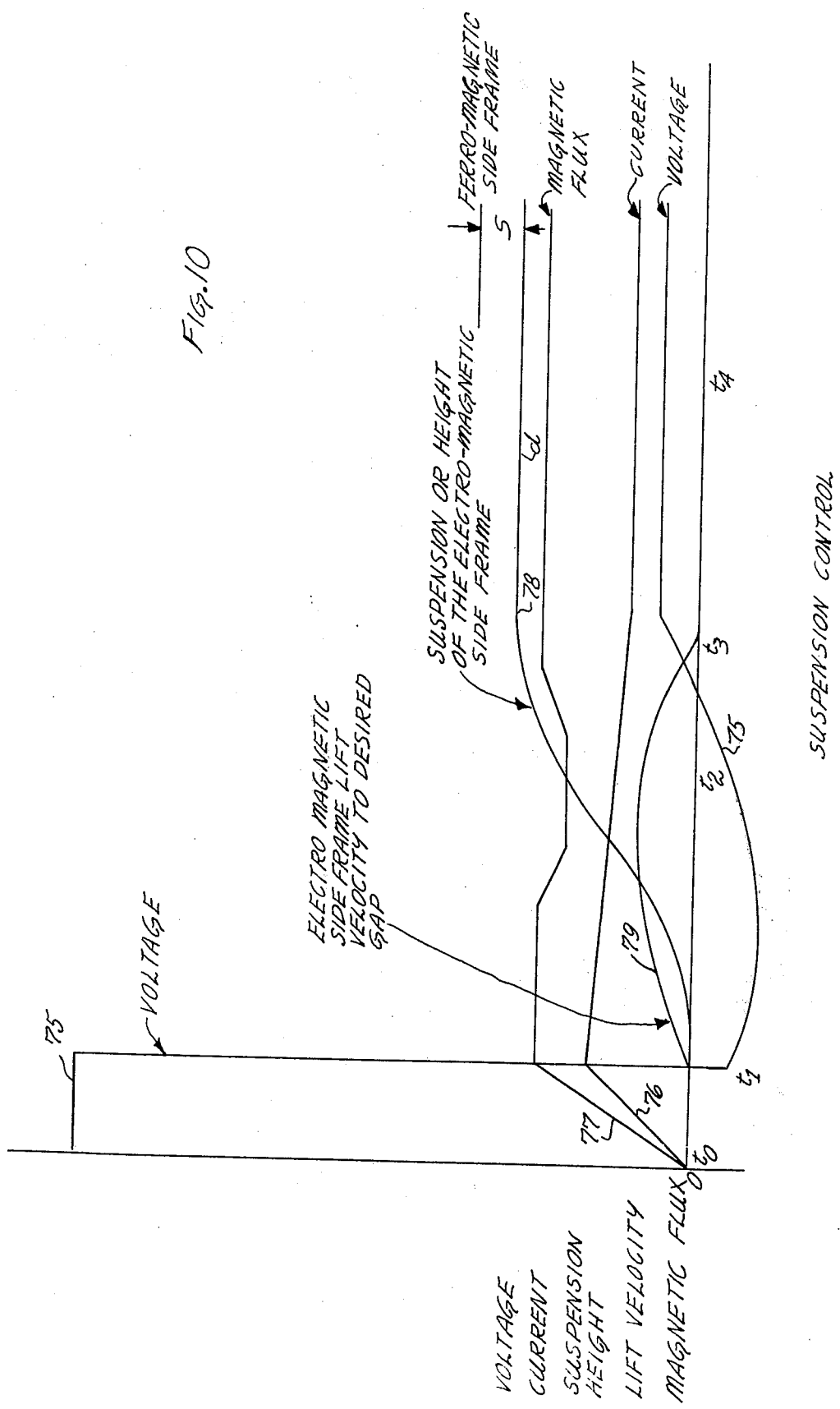

RAILWAY TRUCK MAGNETIC SUSPENSION

This application is a continuation-in-part of copending application Ser. No. 251,118, filed May 8, 1972, now Pat. No. 3,886,871, issued June 30, 1975.

BACKGROUND OF THE INVENTION

This invention pertains to an improved suspension and dampening system to provide "smooth course" and "soft ride" characteristics to vehicles used in moving passengers and freight along a supporting surface, and more specifically to a trackway guided vehicle traveling at speeds upward from 80 miles an hour.

In the field of flange wheel solid rail train systems used throughout the world, there has been little change in the art for the past 150 years. Although this basic system concept has been highly successful in the past, limitations which become manifested at highest speeds render their use on faster and more comfortable trains impractical and infeasible. Although flanged wheels are entirely successful for the relatively slow speeds of the nineteenth and the first half of the twentieth century, presently required higher speeds have interposed limitations on this mode of travel since, at such speeds, the skip oscillations or jumping of the wheels along the track occurs which results in a rough and uncomfortable ride. The high speed limitations have not successfully been overcome by currently designed vehicles using prior art suspension systems.

Any form of the present wheeled land transport, whatever its design, has to run over a roadbed which has a more or less irregular surface. At the present time, all the railways in the world, almost without exception, use vehicles with passive suspension systems. At slow speeds these systems perform the task of providing a soft ride relatively well but are nearly totally unsuccessful as high speeds are reached.

It has been recently realized that the only way to successfully provide ease of ride conditions for the passengers and freight through a range of various speeds of a railway vehicle is to be able to change the vehicle's suspension properties while it is in motion to satisfy varying physical conditions. In the October 1970 issue of "Automotive News" a new suspension system to be utilized in a tracked air cushion vehicle is described. The system uses three layers of suspension separating the passenger compartment from the guideway. The first chassis layer consists of jet air cushions. Second intermediate and third body layers consist of passive air springs for suspension and active conventional hydraulic elements for damping. Accelerometers on both chassis and body layers are provided to generate signals when either move from a predetermined position. These signals are fed into an onboard computer to calculate the hydraulic pressure required by the various hydraulic elements to maintain the body on a smooth path.

Various luxury automobiles use similar passive springs for suspension and active hydraulic or pneumatic/hydraulic damping means working in combination therewith as well as hydraulic or hydraulic/pneumatic means for both suspension and active damping.

M. W. Dewey, U.S. Pat. No. 408,465, and J. S. Rogers, U.S. Pat. No. 833,635, disclose electromagnetic attractive supports to provide friction reduction between sprung and unsprung parts of a railway running gear or truck system. Dewey provides an electromagnetic type bearing between the axle and weight supporting member at the ends of the axle and Rogers provides an electromagnetic support between the center of the axle and the weight supporting member. Neither of these teachings provide for an absence of physical contact between the truck assemblies and the weight supporting member, therefore, neither teach prevention of track vibration transmission to the weight supporting member nor an active control of the electromagnetic force field that could provide and maintain an air gap between the truck assembly and the weight support member to prevent this vibration transmission.

The German patents to Herman Kemper, 643,316 (1937), 644,302 (1938), and 707,032 (1941), disclose the suspension of tracked vehicles by use of electromagnets. The 1938 patent is specifically concerned with providing feedback for preventing oscillations of the suspended vehicle caused by the kinetic energy acquired by the vehicle in response to correction of position and, further, in preventing high acceleration of change of motor energy level from causing further changes in energy level when the correct level is reached. The position feedback voltage produces a directing magnetic force to return the suspended vehicle to the correct location relative to the rails. This type of position feedback voltage is undesirable at high speeds because the sprung portion will try to follow the perturbations of the rail resulting in a rough ride.

The various prior art vehicles having sprung and unsprung portions have common disadvantages, namely, that each has mechanically interconnecting parts that must periodically be replaced due to wear. In addition, the prior art has not disclosed how suspension systems such as disclosed by Kemper, Rogers and Dewey would be combined to provide an active magnetic suspension for a sprung/unsprung system in the manner of the hydraulic/pneumatic suspension system of the referenced "Automotive News" disclosure.

SUMMARY OF THE INVENTION

In accordance with the present invention there is provided a novel combination active magnetic suspension and damping system for providing soft ride characteristics to the sprung portion of a vehicle traveling at high speed along its supporting surface.

Further purposes of the instant invention are to provide an active soft ride suspension system employing no mechanical interconnecting parts between the sprung and unsprung portions of the vehicle resulting in a reduction in the overall weight of the suspension system and for providing for banking when lateral acceleration forces are encountered. These and other features are provided by active control of non-contact magnetic attractive support between the unsprung surface contacting elements and the sprung load carrying elements. The support is maintained by magnetic force fields in response to inertial and position sensing elements mounted on the sprung portion and operative in a non-linear feedback circuit. The strength of the force field is thus actively varied to maintain a relatively stable air gap between the unsprung and sprung elements while also holding the sprung element to a smooth course regardless of uneven surface conditions encountered by the unsprung surface contacting portion or load variations on the sprung portion.

With the above and other objects, features and advantages of this invention, the same consists in the construction, combination and arrangement of parts all as hereinafter more fully described and illustrated.

In the drawings, wherein similar reference characters refer to similar parts throughout the several views.

BRIEF DESCRIPTION OF THE DRAWINGS

FIG. 7 is a transverse end view of the truck of FIG. 2.

FIG. 10 is a graph showing the variation of the voltage, current and flux vs time as the mass varied by the electro-magnetic side frame is lifted from the safety support to within the desired operating air-gap between the electro-magnetic and ferro-magnetic side frames.

DETAILED DESCRIPTION OF THE FIRST PREFERRED EMBODIMENT

The present invention relates to an active magnetic suspension and damping system for providing easy ride characteristics to the sprung portion of a surface supported vehicle capable of traveling at a wide range of speeds including those of the present art as well as upward and beyond 400 miles per hour.

Figure 1:
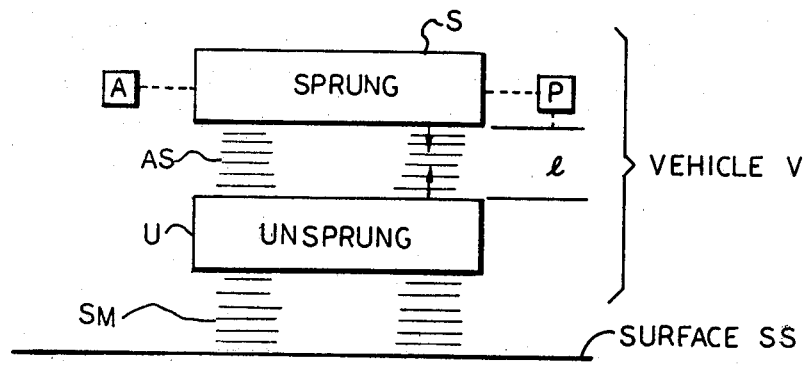
FIG. 1 is a diagrammatic view of a transport vehicle employing the active suspension concepts of the present invention.

With reference to FIG. 1, a vehicle V comprising sprung and unsprung portions S and U is disposed above a support surface SS over which it is to be transported. To this end, the support medium SM may be of any suitable type such as an air cushion, bearings, magnetic suspension, or a conventional rail/wheel system. The active suspension AS for purposes of this invention, is an attractive magnetic force field actively controlled by an accelerometer A which acts as an inertial sensor to detect the movement and a position transducer P which senses the length of gap $l$ between the sprung and unsprung portions.

Figure 2:
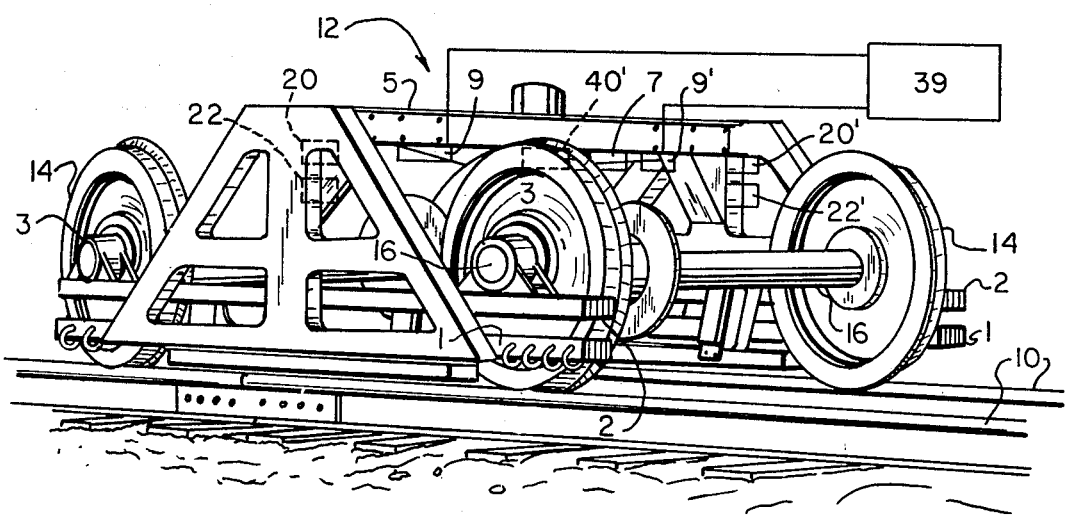
FIG. 2 is a perspective view of a conventional railway truck embodying the invention.

The preferred embodiment of the invention is an application to conventional rail-wheel railway systems shown in FIG. 2, commonly in use throughout the world. This invention, however, is not limited to this single application and is equally as advantageous when applied, as aforenoted, to vehicles suspended from their supporting surface by such means as air cushions, air bearings, magnetic means and various other means that are well known in the transportation art.

Figure 3:
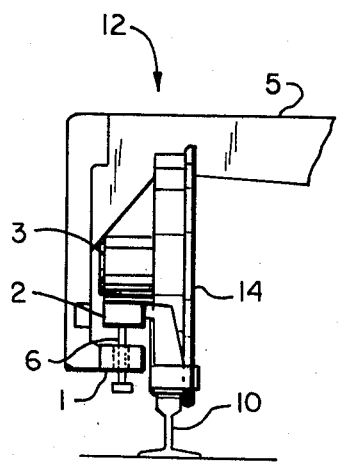
FIG. 3 is a transverse view of a fragmentary portion of the truck of FIG. 2.

Referring now to FIG. 2 and FIG. 3, a conventional trackway consisting of a pair of juxtaposed steel support and guide rails 10. A vehicle support track 21 consisting of flanged wheels 14, axles 16 interconnecting a pair of flanged wheels, and ferromagnetic side frames 2 supported by axle hub bearings 3 at the ends of each axle is provided. Directly opposed, positioned below and of equal size to the ferromagnetic side frame 2 is an electromagnetic side frame 1 carried by the main vehicle weight supporting body bolster 5 that is directly coupled to the structure of the main vehicle, not shown. At the centers of each ferromagnetic side frame 2 is a safety support rod and block 6 normally positioned with no physical contact with the electromagnetic side frame 1 but designed to prevent the supporting body bolster 5 from falling to the support surface or losing the opposed relationship between the ferromagnetic side frame 2 and the electromagnetic side frame 1 in the event of a loss of the force field.

Figure 6:
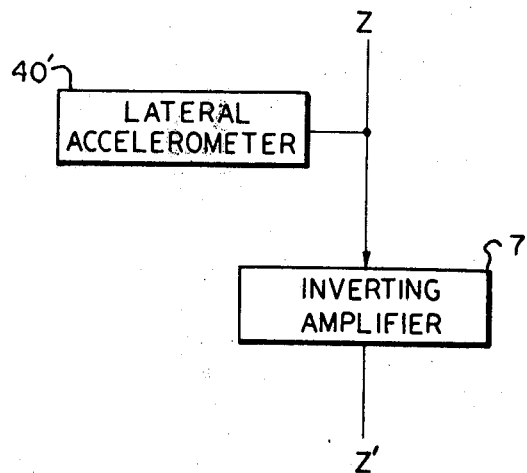
FIG. 6 is a block diagram showing interconnecting components insertable at the Z—Z' of FIG. 4 to include lateral stability.
Figure 4:
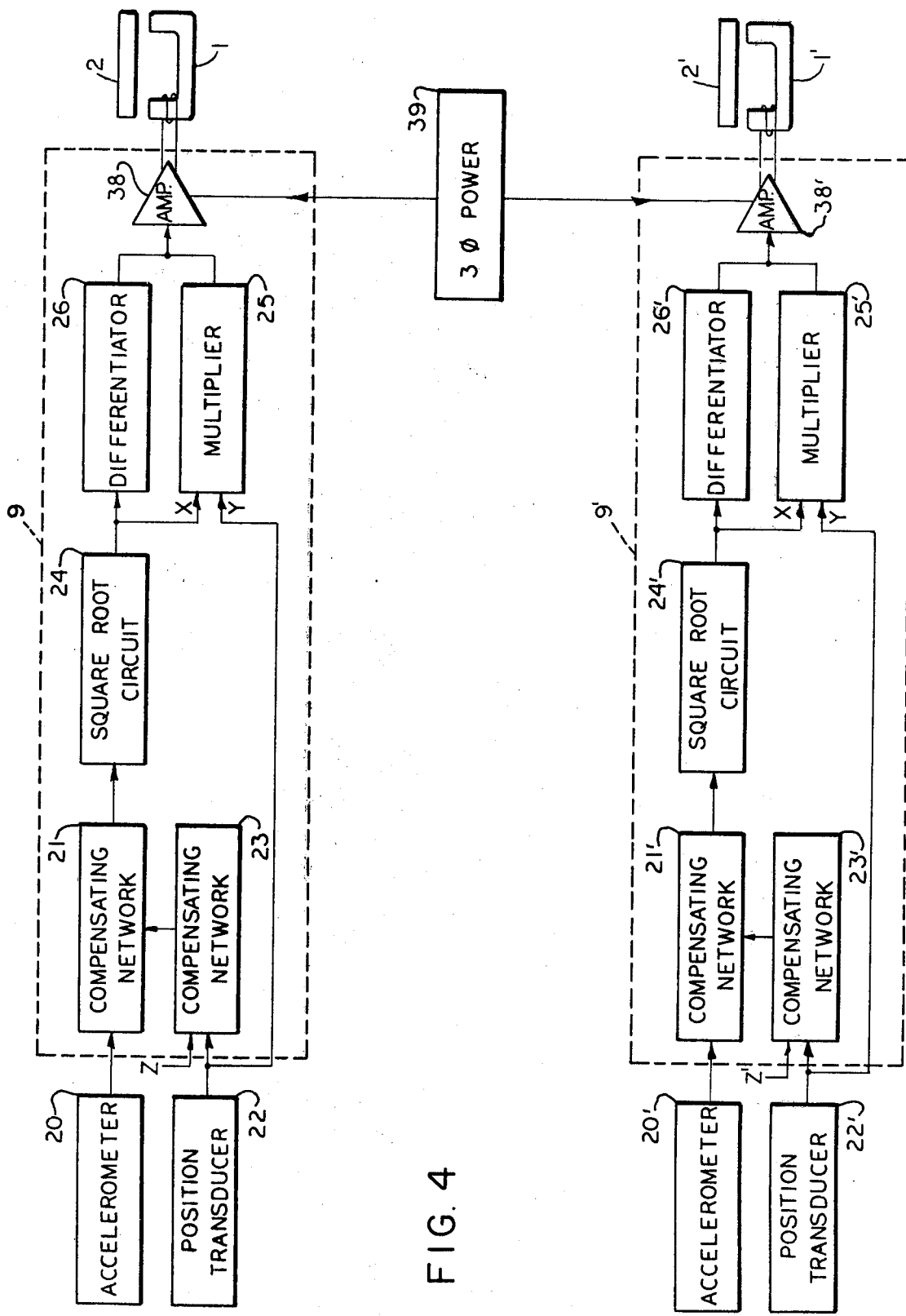
FIG. 4 is a block diagram of the complete electrical control system comprising the active suspension for the truck of FIG. 2.
Figure 5:
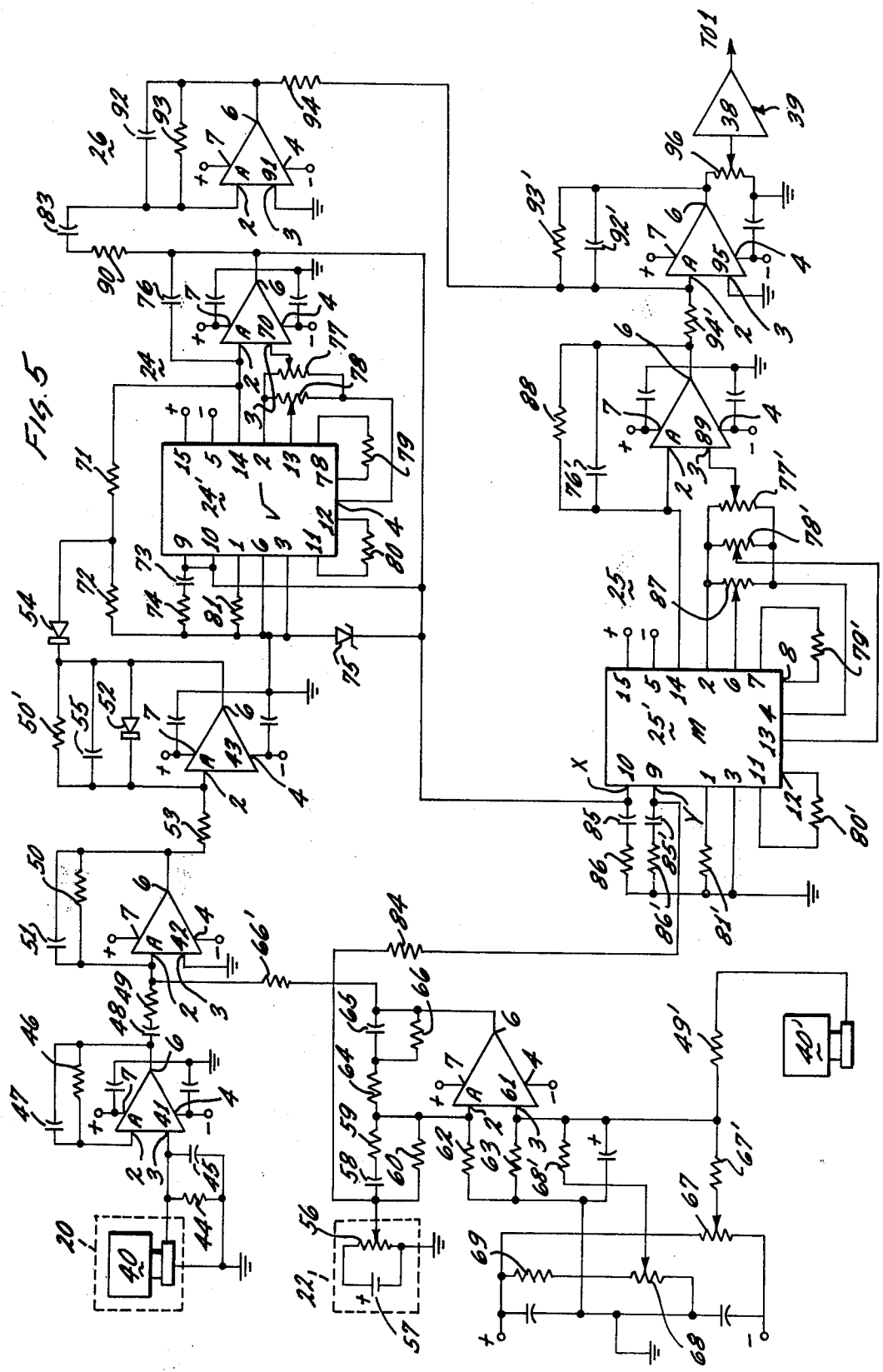
FIG. 5 is a schematic showing of the common circuit of the upper and lower block portion of FIG. 4.

Each body bolster 5, in addition to carrying the electromagnetic side frame 1, carries a pair of sensors 20 and 22 and an electronic circuit, shown in FIGS. 4, 5, and 6 and represented by the block showing of FIGS. 2 and 7. The first sensor 20 is an accelerometer for monitoring acceleration of movement of the electromagnetic side frame 1 from a predetermined position with respect to a fixed point in free space and the second sensor 22 for monitoring the change of the predetermined air gap distance between the electromagnetic side frame 1 and the ferromagnetic side frame 2. The electrical output signals from these sensors are then conditioned by the electronic circuit to provide sufficient control of the force field at the electromagnetic side frame 1 to provide constant non-contact support between the unsprung portion, the wheel and rail, and the sprung portion, the vehicle support member under varying load conditions, such as; climbing grades, irregular track smoothness, winds, additional weight applied to the sprung portion, shifting of weight within the sprung portion, and other conditions known to affect moving vehicles. The electronic circuit, shown in block diagram in FIG. 4, is and has the same principles of operation and reference numerals as described in detail as FIG. 3 in the issued Pat. No. 3,638,093 entitled "Magnetic Suspension and Propulsion System" by the co-inventor of this invention, James A. Ross, and assigned to the assignee of the instant application. The circuit requirements for this application have been modified somewhat from the above referenced applications by requiring a slight additional electrical adjustment as hereinafter described.

As in the aforementioned applications, the feedback circuit is non-linear for the purpose of compensating for the non-linear characteristics of the electromagnetic force field as a function of gap spacing.

The electronic circuit of FIG. 5 is a showing of the circuit 4A of the referenced Pat. No. 3,638,093 and includes the same reference numerals and theory of operation as fully described therein. The circuit of FIG. 5 is a complete showing of the components of the blocks of either 20–26 or 20'–26' of FIG. 5. The additional accelerometer 40' (attached to the amplifier 61 circuit) and the power amplifier are further included to show their relationship to the circuit.

A complete feedback control circuit consists of the two sensors 20 and 22, an electronic circuit 9 comprising two compensating networks 21 and 23, a square rooter 24, a differentiator 26, a multiplier 25 and a power amplifier 38 and the electromagnetic side frame 1.

OPERATION OF FIRST EMBODIMENT

When the vehicle employing the described invention is at rest and all external power, as hereinafter explained, is removed, the safety rods 6 limit the vehicle body bolster 5 position with respect to the ferromagnetic side frame 2 as well as maintaining longitudinal alignment between the ferromagnetic side frame 2 and the electromagnetic side frame 1 under extreme acceleration or deceleration conditions. When power is first applied to the system, the wiper of resistor 68, see FIG. 5, is adjusted in the maximum resistance position with respect to the voltage input resistor 69. The system power is then applied. After power is applied the wiper of resistor 68 is adjusted in a manner to decrease the resistance with respect to the + voltage input to resistor 69 until the voltage level present on terminal 3 of amplifier 61 causes sufficient output signal voltage at terminal 6 of the same amplifier to furnish the required input to the remainder of the electronic circuits, to cause the electromagnetic side frames 1 to have a sufficient magnetic force field to cause the vehicle supporting body bolster 5 carried by the electric magnetic force field to rise toward the ferromagnetic side frame 2 and establish the desired gap spacing. The lift movement will stop and the side frames of the body bolster will be suspended below the ferromagnetic side frame 2 at a point in time when the voltage signal from displacement sensor 22, as applied to terminal 2 of amplifier 61, equals the voltage on terminal 3 of the same amplifier provided by the resistor 68 adjustment.

If the vehicle sprung portion encounters downward or upward acting force vectors causing the air gap spacing to increase or decrease the sensors will detect the acceleration of this movement with respect to a fixed point in free space as well as the displacement change and produce corresponding electrical output signals. The signal from the accelerometer sensing element 20 first passes through a compensating network 21 to alter the frequency versus amplitude response through a frequency range of from 0.3 to 30 hertz. The signal from displacement sensor 22 also first passes into its corresponding compensating network 23. This network provides an adjustable reference, hereinbefore mentioned as an adjustment of R68 for the gap length measurement in electrical terms, provides amplification and differentiation to provide a velocity signal at frequencies above 1.2 hertz. Thereafter the position signal combines with the acceleration signal within compensating network 21 for common amplification.

The attractive force between the ferromagnetic side frame 2 and the electromagnetic side frame 1 is proportional to the square of the current passing through the coils of the electromagnets. To provide feedback loop stability, the second order function in the signal flow path must be linearized. To accomplish this the conditioned and amplified combined accelerometer and displacement sensor signal present at the output of the compensating network 23 is linearized by square root circuit 24, typically an operational amplifier employing non-linear transistor characteristics to give an electrical output that is the equivalent of the square root of its positive electrical input.

Multiplier 25 is another operational amplifier in which the output is the product of two electrical inputs. The output of the square rooter circuit 24 supplies the X input and the length of gap signal from the displacement sensor 22 supplies the Y input. These signals are then multiplied together by multiplier 25, the resultant voltage output being directly proportional to gap, i.e. the voltage increases with an increase in gap.

The electrical path through multiplier 25 is conductive so that an electrical output is present at zero frequency, for example, when the gap length is constant between the ferromagnetic side frame 2 and the electromagnetic side frame 1.

The output signal from the square rooter 24 is also fed into the input of differentiator 26. The differentiator is comprised of an amplifier having a resistance capacitance circuit, to accomplish electrical differentiation. The capacitor is not shunted by any conductive path so that the output of the differentiator is zero for a zero frequency. This provides an A.C. path with the output combined with that of the multiplier 25, and gives an increasing voltage output with an increase feedback frequency.

The output signal from multiplier 25 and differentiator 26 are then equal at the frequency that the electromagnetic rail D.C. resistance equals its A.C. reactance; at higher frequencies the electromagnetic rail force field is not a function of the gap.

The combined output signal from multiplier 25 and differentiator 26 passes into power amplifier 38. This consists of a very high power amplifier, preferably class "D" as described in Pat. No. 3,579,132, by co-inventor James A. Ross and assigned to the assignee of the instant application, with its current output controlled according to the amplitude of the aforementioned input.

The output power from amplifier 38 is supplied to the windings of the electromagnetic side frame 1, which is attracted to the ferromagnetic side frame 2 under feedback control to prevent the electromagnetic side frame from attracting all the way to contact with the ferromagnetic side frame.

The basic source of power for the system including the high power amplifier is an external source 39 of multi-phase power well known in the art.

FIG. 10 shows the variation of the several parameters involved in lifting the electro-magnetic side frame 1 from the safety support toward the ferromagnetic side frame 2 and maintaining the air-gap between side frames 1 and 2 at a prescribed length.

The weight carried by the electro-magnetic side frame 1 is to be raised a distance $d$ to reduce the air-gap length $l$ to a desired value $s$. This value may be of the order of one inch.

In the graph the abscissa is time and the ordinate has various values, as will be evident.

At time equals zero, i.e., the start of the lifting process, the voltage is impressed upon the coil windings of the electro-magnetic side frame. It rises to a high saturation level, as shown at 75. The corresponding current 76 in the windings involved starts with a zero value at time eqlas zero and increases as a ramp function until time $t_1$, at which time an upward velocity of the electromagnetic side frame toward the ferro-magnetic side frame starts. The magnetic flux produced by the electro-magnetic side frame and extending into the ferromagnetic side frame increases as the current increases and so this is a companion ramp function, shown as 77 in FIG. 10.

As soon as an upward velocity of the electromagnetic side rail starts an acceleration exists and this is sensed by the accelerometer. Through the feedback circuit that has been described, the accelerometer signal reduces the applied voltage 75 to zero; actually to a small negative value as shown. This allows the upward velocity to be controlled. After an initial value of zero at time $t_1$, it reaches a maximum value at a later time $t_2$ at and after which time the upward velocity is decreased.

Displacement curve 78 starts from zero at time $t_1$ and increases positively, but at a slower rate than the velocity curve 79. The proper value of feedback signal causes the displacement curve to cease changing with time after a time $t_3$ is reached. This signifies attainment of the preselected gap length. At time $t_3$, velocity curve 79 has decreased to zero. The desired vertical position has been achieved. At time $t_3$, the length of air-gap has decreased from the initial value. Less current 76 is thus required to maintain the needed flux and so this parameter remains constant with time at a value less than that existing at time $t_1$.

Flux curve 77 remains at a constant value with respect to time from time $t_1$ to about halfway between time $t_1$ and $t_2$. The flux is then reduced to a value les than that required to support the weight carried by the electro-magnetic side frame. This causes the upward velocity of the electro-magnetic side frame to be reduced, thus producing a negative acceleration, or deceleration.

The prior negative value of applied voltage reverses as the other parameters reach equilibrium shortly before time $t_3$, After time $t_3$, it remains at a relatively small positive value that is sufficient to cause current 76 to flow at an amplitude to maintain flux 77 at a constant value.

By the time $t_3$ has been reached, the air-gap has been reduced to the preselected value of $s$. It remains at that value unless there are external factors acting to change it. If such factors tend to increase the gap length the same variation of the several parameters, as previously described, occurs and the gap length is reduced to the preselected value. If such factors tend to decrease the gap length, the several parameters vary in the opposite manner.

For this preferred embodiment each vehicle is typically supported with two truck assemblies each carrying two of the aforedescribed suspension control systems, one positioned on each side corresponding with each rail of a two rail system. This provides uniform stability to both sides of the vehicle supported by each truck assembly.

Figure 8:
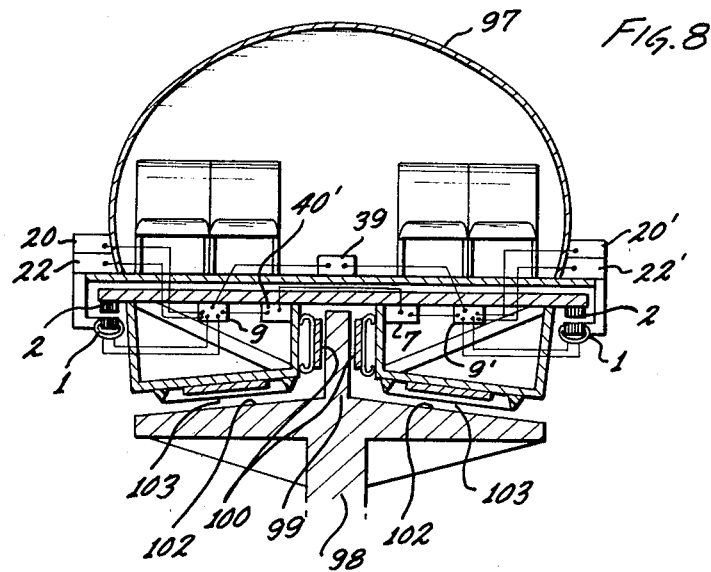
FIG. 8 is a sectional view of a vehicle suspended and guided by an air cushion.

FIG. 8 shows an alternate embodiment wherein the instant invention is utilized on an air cushion high speed vehicle 97. The operation of the support and guidance systems are fully described in U.S. Pat. No. 3,330,384. A main guideway support 98 includes center upright member 99 utilized in combination with high pressure air outlets 100 for guiding the vehicle 97 while the guideway support 98 upper surface areas 102 cooperate with high pressure air outlets 103 for providing vehicle support.

Figure 9:
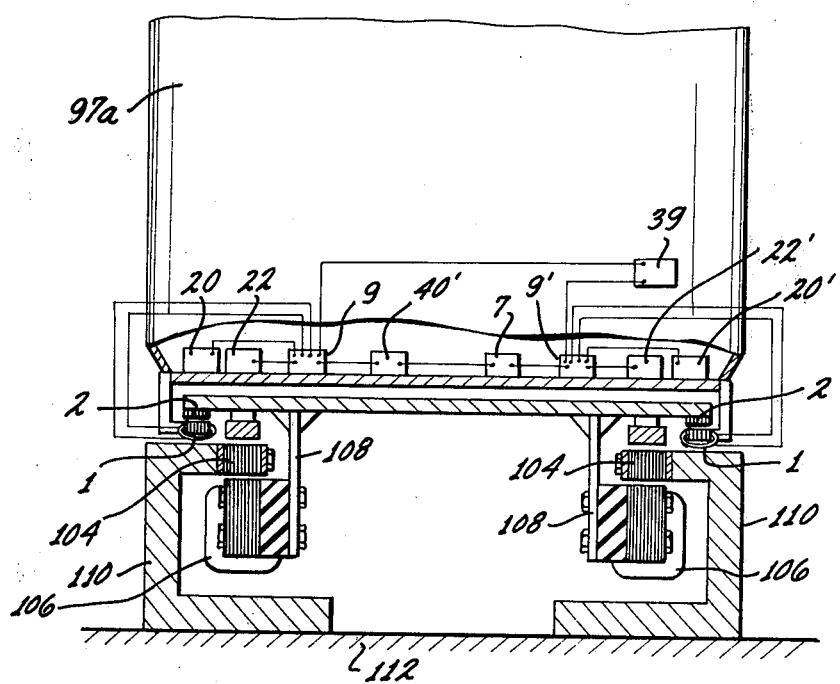
FIG. 9 is a sectional view of a vehicle suspended and guided by magnetic force fields.

FIG. 9 shows a further alternate embodiment wherein the instant invention is utilized on a magnetic supported vehicle 97a such as the one disclosed in U.S. Pat. No. 3,736,880. Surface 112 supports rail supports 110 that in turn support ferromagnetic members 104. The vehicle has a pair of support members 108 with electromagnets 106 attached thereto. The control system also disclosed in detail in the last mentioned U.S. patent maintains the intensity of the force field of electromagnets 106 so that the vehicle is attracted upward to a predetermined position with respect to support surface 112 wherein the force of gravity is overcome and ferromagnetic member 104 and electromagnet 106 establish a spaced apart relationship that remains substantially constant as the vehicle moves along the guideway.

When surface support systems other than the fully described two rail systems are desired, various single or multiple combinations of described support systems may be used for the same easy-ride suspension effect.

DETAILED DESCRIPTION OF THE SECOND PREFERRED EMBODIMENT

This second preferred embodiment includes all of the elements of the first preferred embodiment as described and in addition, includes a lateral accelerometer 40', a summing resistor 49', and inverting amplifier 7 of any convenient type having a one-to-one gain ratio with an output inverted with respect to the input. The accelerometer is preferably a model 4310 manufactured by Systron Donner. The accelerometer is mounted on the sprung portion of the vehicle in a manner for detection of the lateral forces acting on the vehicle. These forces include, but are not limited to, such forces as those caused by changing the vehicle forward direction or extreme wind.

OPERATION OF THE SECOND PREFERRED EMBODIMENT

The suspension system operates in the same manner as hereinbefore described in the first preferred embodiment.

When the vehicle is equipped with a lateral accelerometer 40' and inverting amplifier 7 interconnected as shown in FIG. 6, a control means for counteracting and effectively cancelling side forces present in vehicle cornering and extreme wind conditions is provided. When, for instance, the vehicle enters a turn at high speed centrifugal forces cause the vehicle to lean toward the outside of the arc of travel and in extreme conditions cause the vehicle to leave its guideway. When such conditions occur the vehicle's lateral forces are detected by accelerometer 40' which provides a voltage signal to terminal 3 of amplifier 61 interconnected as shown in FIG. 5 for controlling the suspension position on the inside of the arc of vehicle travel. A corresponding and equal, but opposite polarity voltage is supplied to terminal 3 of amplifier 61, not shown, for controlling the suspension position on the outside of the arc of vehicle travel. These voltage signals cause the magnetic force between the ferromagnetic side frame 2 and the electromagnet side frame 1 to increase and decrease respectively and stabilize thus narrowing the gap on the inside of the arc of vehicle travel and increasing the gap on the outside of the arc of vehicle travel. This results in a banking of the vehicle into the inside of its arc of travel, which effectively cancels lateral movement of the vehicle resulting from the lateral forces created by the change of direction of forward travel.

The signal from the accelerometer can be either negative or positive depending upon the physical placement of the unit and the direction in which lateral forces effect movement of the vehicle. THe inverting amplifier 7 is provided in series with the input to one sensing system to insure that when the force field is either increased or decreased on a given side of the vehicle the opposite force field will correspond in an opposite manner to either decrease or increase with equal amplitude.

This lateral control feature can be employed in combination with mechanically flat rail curves or with mechanically banked rail curves both to cancel side forces acting on the vehicle or as a safety feature to prevent the vehicle from being derailed under certain extreme conditions.

This invention may be embodied in other forms or carried out in other ways without departing from the spirit or essential characteristics thereof. The present embodiments and examples of the invention are, therefore, to be considered as in all respects illustrative and not restrictive, the scope of the invention being indicated by the appended claims, and all changes which come within the meaning and range of equivalency of the claims are intended to be embraced therein.

Having thus described the invention, what is claimed as new and novel and is desired to be secured by U.S. Letters Patent is:

1. An improved attractive magnetic suspension and vertical damping apparatus for providing an air gap spaced apart support between the bolster and side frame assembly and surface supported portions of the truck of a high speed vehicle comprising:
   elongated ferromagnetic side frames carried by said surface supported portion;
   air cushion support means positioned between said surface supported portions and the supporting surface;
   elongated electromagnets having windings and carried by said bolster and side frame assembly portion, each of said electromagnets positioned below one of said ferromagnetic side frames in opposing spaced relation therewith for magnetic attraction therebetween; and
   active control means for constantly varying the strength of the force fields of said electromagnets responsive to the length of said gap and to the vertical movement of the bolster and side frame assembly portion for maintaining a predetermined spaced gap relationship and damping control between said bolster and side frame assembly and surface supported poritons.

2. An improved attractive magnetic suspension and vertical damping apparatus for providing an air gap spaced apart support between the bolster and side frame assembly and surface supported portions of the truck of a high speed vehicle comprising:
   elongated ferromagnetic side frames carried by said surface supported portion;
   magnetic support means positioned between said surface support portions and the support surface;
   elongated electromagnets having windings and carried by said bolster and side frame assembly portion, each of said electromagnets positioned below one of said ferromagnetic side frames in opposing spaced relation therewith for magnetic attraction therebetween; and
   active control means for constantly varying the strength of the force fields of said electromagnets responsive to the length of said gap and to the vertical movement of the bolster and side frame assembly portion for maintaining a predetermined spaced gap relationship and damping control between said bolster and side frame assembly and surface supported portions.

3. The apparatus of claim 2 wherein said magnetic support is provided by an attractive force field.

* * * * *